(12) United States Patent
Kurtz et al.

(10) Patent No.: US 10,502,152 B2
(45) Date of Patent: Dec. 10, 2019

(54) METHOD FOR OPERATING AN ENGINE (71) Applicant: Ford Global Technologies, LLC, Dearborn, MI (US)

(72) Inventors: Eric Matthew Kurtz, Dearborn, MI (US); Eric James Kastanis, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 15/728,270

(22) Filed: Oct. 9, 2017

(65) Prior Publication Data

US 2019/0107066 A1    Apr. 11, 2019

(51) Int. Cl.
| | |
|---|---|
| *F02D 41/02* | (2006.01) |
| *F01N 3/023* | (2006.01) |
| *F01N 3/10* | (2006.01) |
| *F01N 3/20* | (2006.01) |
| *F01N 9/00* | (2006.01) |
| *F01N 11/00* | (2006.01) |
| *F02B 37/24* | (2006.01) |

(Continued)

(52) U.S. Cl.
CPC ........... *F02D 41/029* (2013.01); *F01N 3/023* (2013.01); *F01N 3/106* (2013.01); *F01N 3/2066* (2013.01); *F01N 9/002* (2013.01); *F01N 11/002* (2013.01); *F02B 37/24* (2013.01); *F02B 75/02* (2013.01); *F02D 41/0007* (2013.01); *F02D 41/0055* (2013.01); *F02D 41/0065* (2013.01); *F02D 41/0077* (2013.01); *F02M 26/05* (2016.02); *F02M 26/06* (2016.02); *F01B 7/14* (2013.01); *F01N 2430/00* (2013.01); *F01N 2900/1602* (2013.01); *F02B 75/28* (2013.01); *F02B 2075/025* (2013.01); *F02D 2041/0017* (2013.01); *F02D 2200/0802* (2013.01)

(58) Field of Classification Search
CPC ........ F01N 11/002; F01N 3/023; F01N 3/106; F01N 3/2066; F01N 9/002; F01N 2430/00; F01N 2900/1602; F02B 37/24; F02B 75/02; F02B 2075/025; F02B 75/28; F02D 41/0007; F02D 41/0055; F02D 41/0065; F02D 41/0077; F02D 41/029; F02D 2041/0017; F02D 2200/0802; F02M 26/05; F02M 26/06; F01B 7/14
See application file for complete search history.

(56) References Cited

U.S. PATENT DOCUMENTS

| | | |
|---|---|---|
| 6,901,751 B2 | 6/2005 | Bunting et al. |
| 7,520,260 B2 | 4/2009 | Nakamura et al. |

(Continued)

OTHER PUBLICATIONS

Kurtz, Eric et al., "Diesel Engine Particulate Filter Regeneration System and Methods," U.S. Appl. No. 15/702,364, filed Sep. 12, 2017, 35 pages.

(Continued)

*Primary Examiner* — Brandon D Lee
(74) *Attorney, Agent, or Firm* — Geoffrey Brumbaugh; McCoy Russell LLP (57) ABSTRACT

Methods and systems for operating an engine during and after regeneration of a particulate filter are described. In one example, exhaust flow is increased and exhaust temperature is decreased in response to ceasing regeneration of a particulate filter so that SCR efficiency may be improved in a short amount of time.

18 Claims, 5 Drawing Sheets

(51) Int. Cl.
    *F02B 75/02*     (2006.01)
    *F02D 41/00*     (2006.01)
    *F02M 26/05*     (2016.01)
    *F02M 26/06*     (2016.01)
    *F02B 75/28*     (2006.01)
    *F01B 7/14*     (2006.01)

(56) References Cited

U.S. PATENT DOCUMENTS

| | | |
|---|---|---|
| 2005/0060989 A1 | 3/2005 | Kawashima et al. |
| 2007/0137179 A1 | 6/2007 | Kondou et al. |
| 2009/0199537 A1 | 8/2009 | Sisken et al. |
| 2011/0146267 A1* | 6/2011 | Hepburn ................. F01N 3/021 |
| | | 60/602 |

OTHER PUBLICATIONS

Kurtz, Eric et al., "Diesel Engine Particulate Filter Regeneration System and Methods," U.S. Appl. No. 15/708,869, filed Sep. 19, 2017, 41 pages.

* cited by examiner

METHOD FOR OPERATING AN ENGINE

BACKGROUND/SUMMARY

A diesel engine may include a selective catalytic reduction (SCR) catalyst to convert NOx to $N_2$, $H_2O$, and $CO_2$. The diesel engine may also include a particulate filter to trap carbonaceous soot. The may be stored until the particulate filter is filled, then the soot may be combusted to regenerate the particulate filter. The particulate filter may be regenerated by heating exhaust gases in an oxidation catalyst and supplying the heated exhaust gases to the particulate filter where the heated exhaust gases may heat the soot until the soot begins to combust in an oxygen rich environment. However, the SCR is heated when the particulate filter is heated, and heating the SCR reduces the efficiency of the SCR. The SCR may remain above a desired temperature for a period of time even after the particulate filter is regenerated. Therefore, it may be desirable to provide a way of reducing an amount of time a SCR is at a temperature greater than a threshold temperature where SCR efficiency may be lower than a threshold.

The inventors herein have recognized the above-mentioned disadvantages and have developed an engine operating method, comprising: increasing turbocharger boost pressure via a controller while driver demand torque is substantially constant in response to ceasing regeneration of a particulate filter.

By increasing boost pressure in response to ceasing particulate filter regeneration while driver demand torque is substantially constant, it may be possible to cool a SCR after particulate filter regeneration so that SCR efficiency may be increased in a short amount of time. The boost pressure may be increased and a charge air cooler bypass valve may be closed to increase exhaust flow and reduce exhaust gas temperature, thereby cooling the SCR. The exhaust flow rate may be reduced to a first flow rate when SCR temperature is less than a first threshold, and the exhaust flow rate may be reduced to a second flow rate when the SCR temperature is less than a second threshold. The reduction of exhaust flow allows for SCR cooling while at the same time increasing engine efficiency.

The present description may provide several advantages. In particular, the approach may reduce engine emissions by increasing SCR efficiency in a reduced amount of time. In addition, the approach may allow for increased engine efficiency while still reducing SCR temperature. Further, the approach may be applicable to four stroke and two stroke diesel engines.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
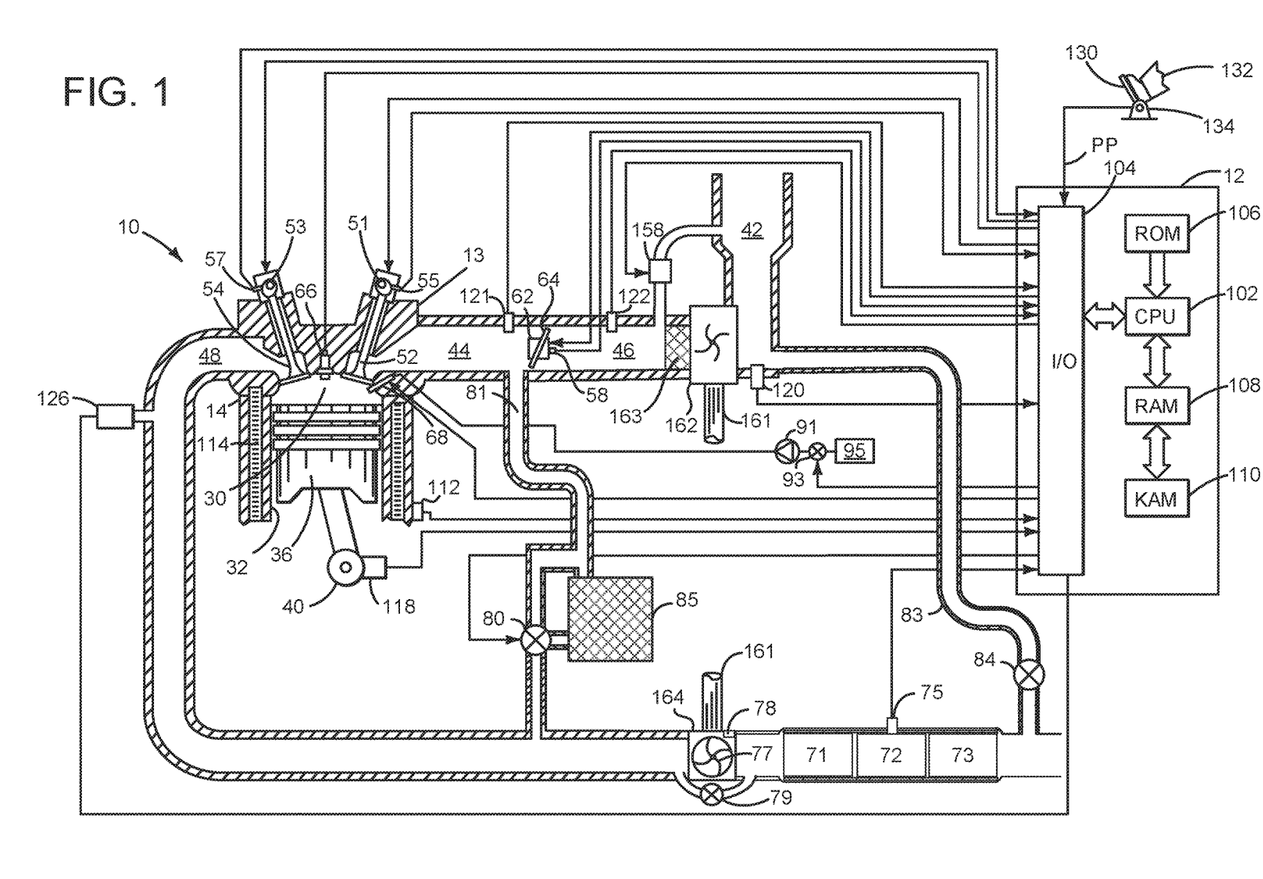
FIG. 1 shows a schematic depiction of a first example engine.
Figure 2:
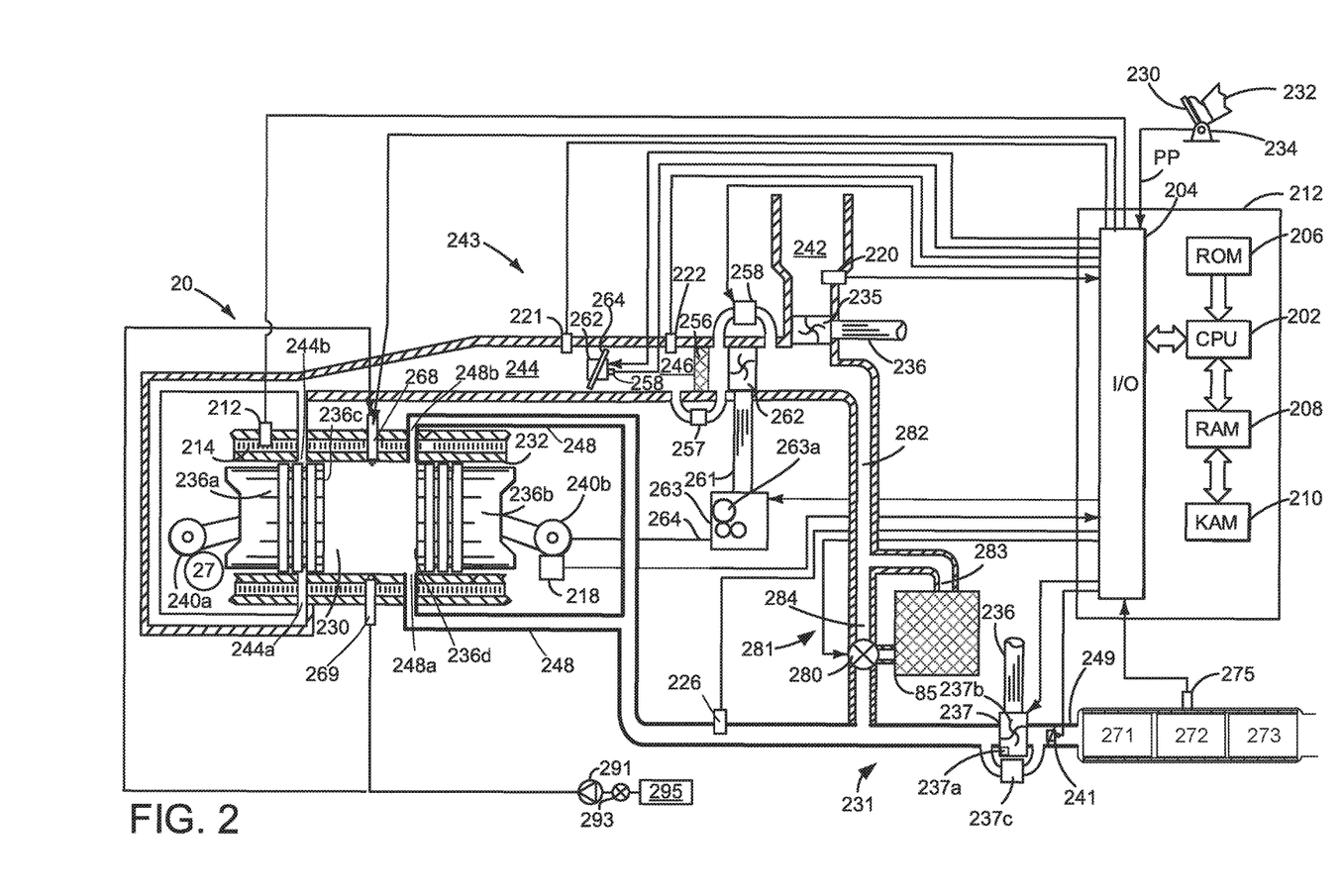
FIG. 2 shows a schematic depiction of a second example engine.
Figure 3A:
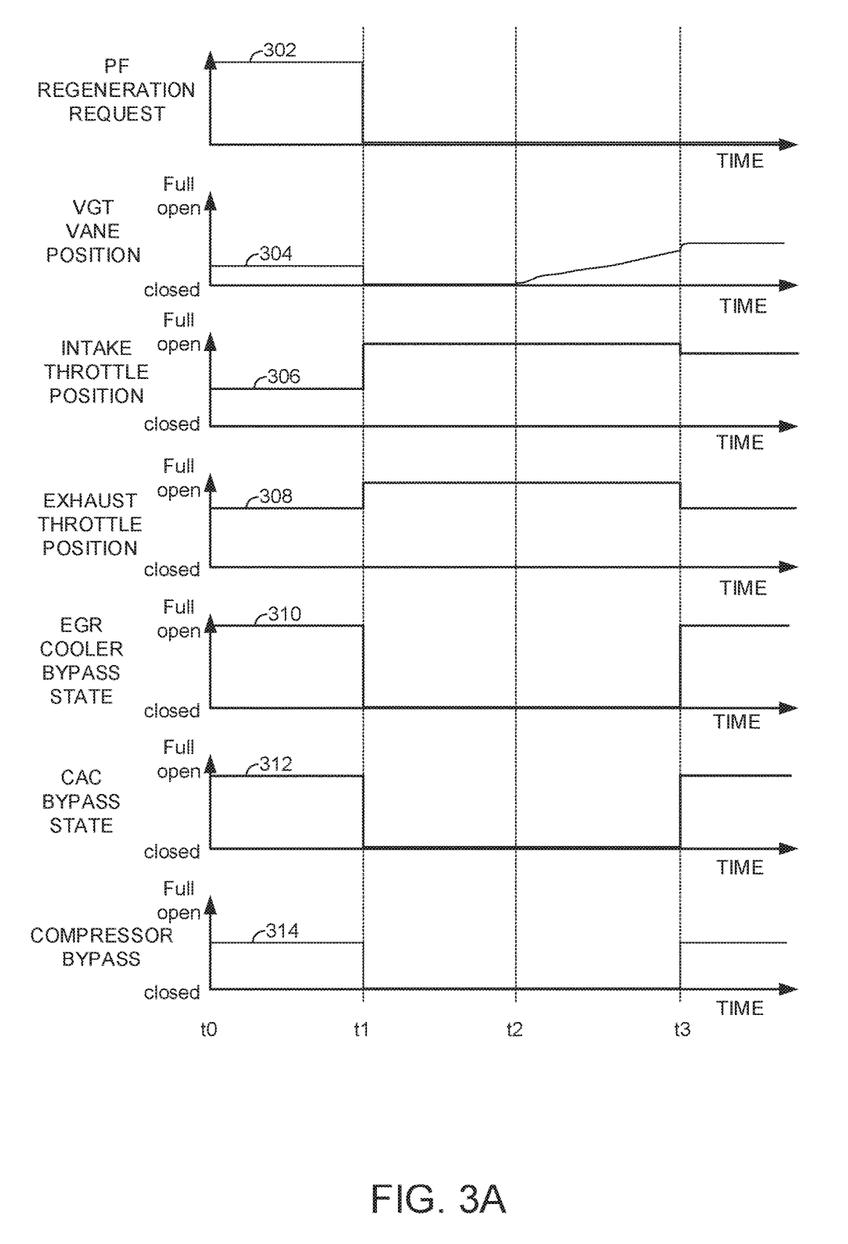
FIGS. 3A-3B shows an example engine operating sequence.
Figure 3B:
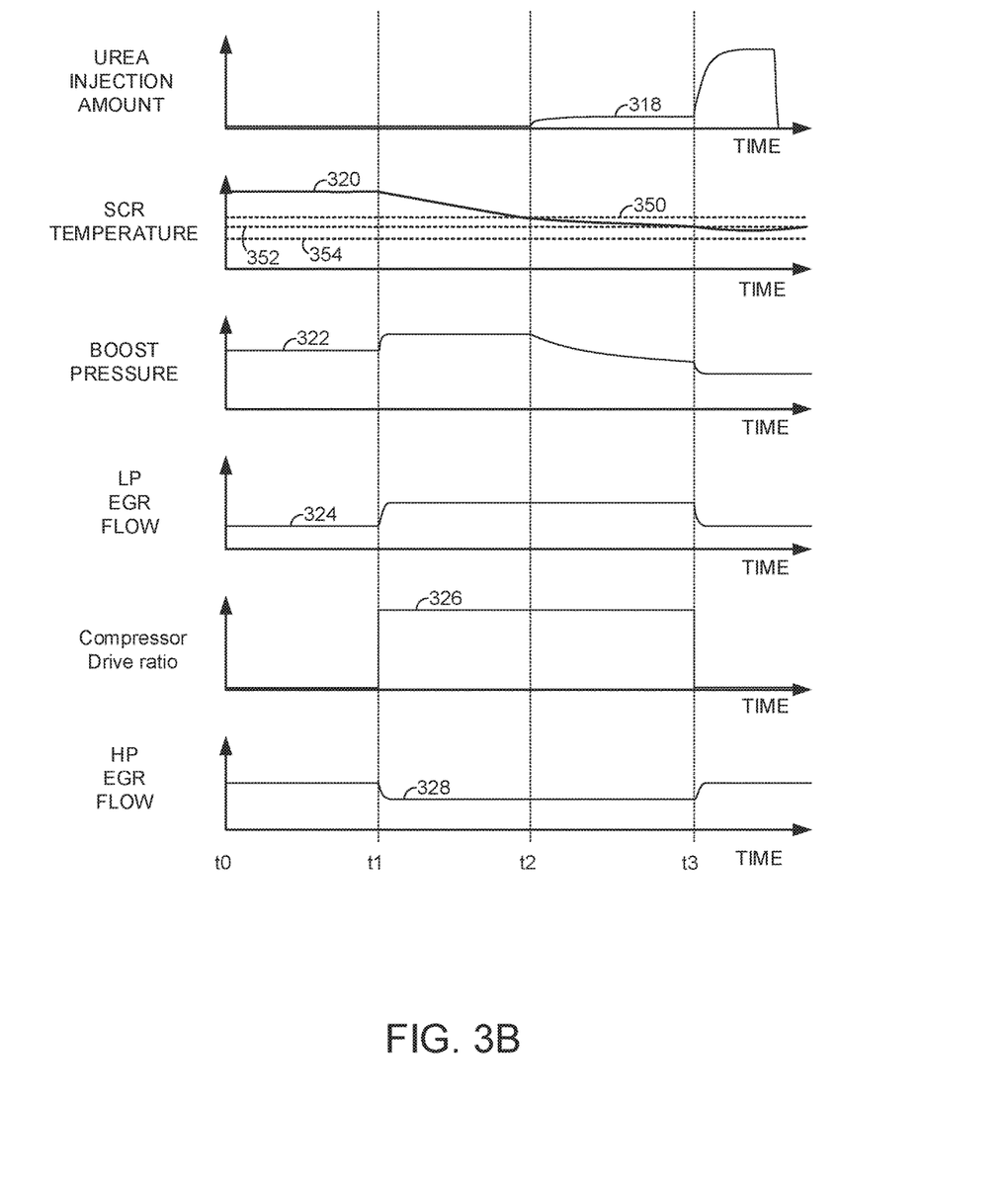
Figure 4:
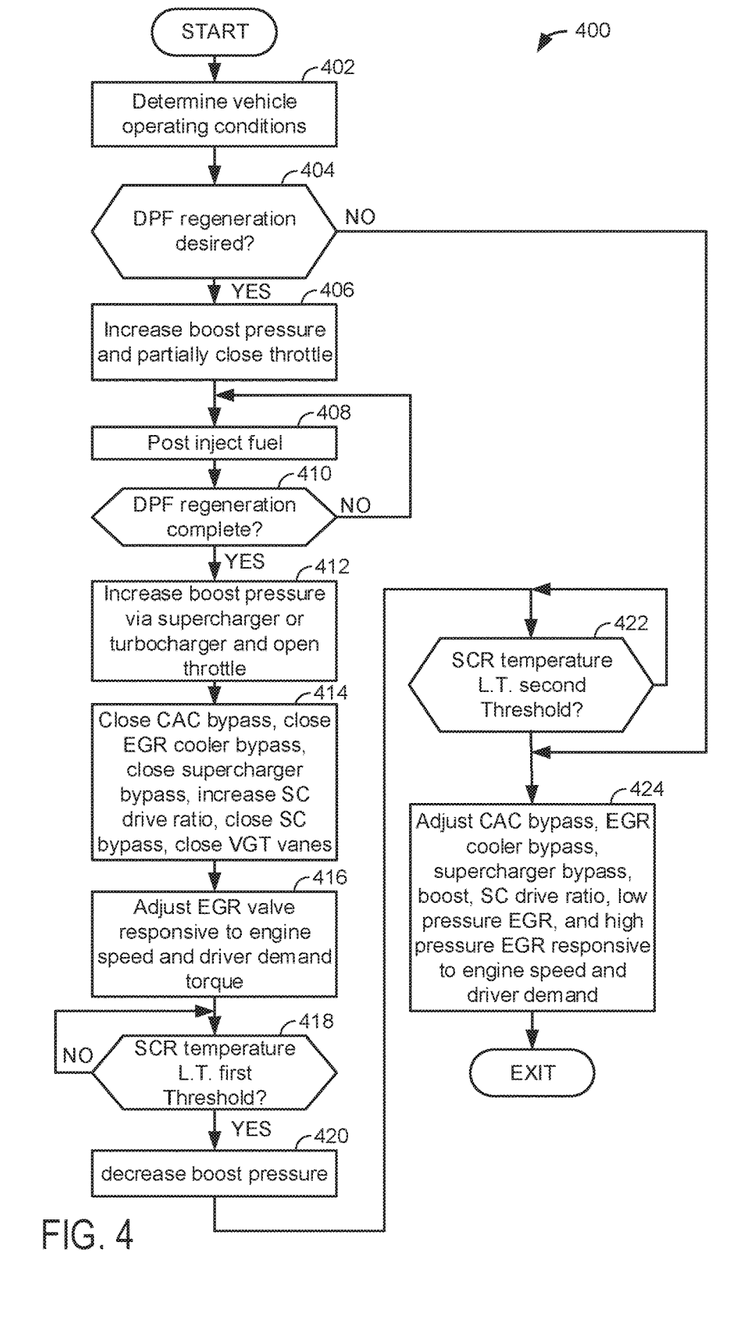
FIG. 4 shows a method for operating an engine.

The present description is related to operating a diesel engine that includes a particulate filter and a SCR. FIG. 1 shows one example of a boosted diesel engine. FIG. 2 shows a second example of a boosted diesel engine. FIGS. 3A and 3B show an example engine operating sequence for improving SCR efficiency after regenerating a particulate filter. FIG. 4 shows an example method for operating an engine to improve SCR efficiency.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 95, fuel pump 91, fuel pump control valve 93, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 79 may replace or be used in addition to variable vane control 78. Variable vane control 78 adjusts a position of variable geometry turbine vanes 77. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 79 or a bypass valve allow exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce the possibility of compressor surge.

Combustion is initiated in combustion chamber 30 when fuel automatically ignites when piston 36 is near top-dead-center compression stroke. In some examples, a universal Exhaust Gas Oxygen (UEGO) sensor 126 may be coupled to exhaust manifold 48 upstream of emissions device 71. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures glow plug 66 may convert electrical energy into thermal energy so as to raise a temperature in combustion chamber 30. By raising temperature of combustion chamber 30, it may be easier to ignite a cylinder air-fuel mixture via compression.

Emissions device 71 can include an oxidation catalyst and it may be followed by a SCR 72 and a diesel particulate filter (DPF) 73, in one example. In another example, DPF 73 may be positioned upstream of SCR 72. Temperature sensor 75 provides an indication of SCR temperature.

High pressure exhaust gas recirculation (EGR) may be provided to the engine via high pressure EGR valve 80 and high pressure EGR passage 81. High pressure EGR valve 80 is a valve that closes or allows exhaust gas to flow from upstream of emissions device 71 to a location in the engine air intake system upstream of compressor 162. High pressure EGR may bypass EGR cooler 85, or alternatively, high pressure EGR may be cooled via passing through EGR cooler 85. Low pressure EGR may be provided to the engine via low pressure EGR valve 84 and lower pressure EGR passage 83.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Referring now to FIG. 2, an alternative engine is shown. Engine 20 is an opposed piston internal combustion engine, comprising a plurality of cylinders, one cylinder of which is shown in FIG. 2, is controlled by electronic engine controller 212. The controller 212 receives signals from the various sensors of FIG. 2 and employs the various actuators of FIG. 2 to adjust engine operation based on the received signals and instructions stored on a memory of the controller.

Engine 20 includes cylinder 230 and cylinder walls 232 with intake piston 236*a* and exhaust piston 236*b* positioned therein and connected to crankshafts 240*a* and 240*b* respectively. Crankshafts 240*a* and 240*b* may be coupled together via belts, chains or gears. Crankshafts 240*a* and 240*b* may be rotated by electric machine 27 (e.g., a starter motor) to crank engine 20. Cylinder 230 is shown communicating with intake manifold 244 and exhaust manifold 248 via intake ports 244*a* and 244*b* and exhaust ports 248*a* and 248*b*.

First fuel injector 269 and second fuel injector 268 are shown positioned in cylinder walls 232 and they may inject fuel directly into cylinder 230, which is known to those skilled in the art as direct injection. Fuel is delivered to first fuel injector 269 and second fuel injector 268 by a fuel system including a fuel tank 295, fuel pump 291, fuel pump control valve 293, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 244 is shown communicating with optional electronic throttle 262 which adjusts a position of throttle plate 264 to control air flow from intake boost chamber 246. Supercharger compressor 262 is mechanically driven and it draws air from downstream of turbocharger compressor 235. Turbocharger compressor 235 draws air from air intake 242. Supercharger compressor 262 supplies air to boost chamber 246. Exhaust gases spin turbocharger variable geometry turbine 237 which is coupled to turbocharger compressor 235 via shaft 236. Supercharger compressor 262 is mechanically driven via crankshaft 240b via shaft 261 and gear box 263, which may be coupled to crankshaft 240b via mechanism 264 (e.g., gears, a chain, or a belt). Supercharger gear box 263 includes a plurality of gear ratios for changing speed of supercharger compressor 262 relative to speed of crankshaft 240b. Supercharger compressor speed may be adjusted via selecting and engaging gears 263a of gear box 263. In one example, a given engine crankshaft speed may rotate supercharger compressor 262 at a first speed and a second speed via switching between a first gear ratio and a second gear ratio in gear box 263.

Supercharger compressor bypass valve 258 may be selectively opened to reduce air pressure in boost chamber 246 and return air and exhaust gas recirculation (EGR) to upstream of supercharger compressor 262. In some examples, a charge air cooler 256 may be provided downstream of supercharger compressor 262 to cool the air charge entering cylinder 230. Air charge cooler bypass valve 257 may be selectively opened to bypass charge air cooler 256. A position of vane actuator 237a may be adjusted via controller 212 to increase or decrease rotational speed of turbine 237. In alternative examples, a waste gate 237b may replace or be used in addition to vane actuator 237a. Vane actuator 237a adjusts a position of variable geometry turbine vanes. Exhaust gases can pass through turbine 237 supplying little energy to rotate turbine 237 when vanes are in an open position. Exhaust gases can pass through turbine 237 and impart increased force on turbine 237 when vanes are in a closed position. Alternatively, wastegate 237b or a bypass valve allows exhaust gases to flow around turbine 237 so as to reduce the amount of energy supplied to the turbine.

In an alternative example, supercharger compressor 262 may be positioned upstream of turbocharger compressor 235. Further, an air charge cooler (not shown) maybe positioned downstream of where EGR passage 282 joins intake 243 between supercharger compressor 262 and turbocharger compressor 235. The air charge cooler would obviate the need for an EGR cooler.

Exhaust gases may be recirculated to cylinder 230 via EGR system 281. EGR system includes optional EGR cooler 285, EGR valve 280, EGR passage 282, EGR cooler bypass 284, and cooled EGR passage 283. Exhaust gases may flow from exhaust manifold 248 to the engine air intake 243 between supercharger compressor 262 and turbocharger compressor 235. EGR may flow to the engine air intake when pressure in exhaust manifold 248 is greater than pressure between turbocharger compressor 235 and supercharger compressor 262. EGR may flow through EGR cooler 285 to reduce engine exhaust gas temperatures. EGR may bypass EGR cooler 285 when engine exhaust temperatures are low.

Fuel may be injected to cylinder 230 when pistons 236a and 236b are approaching each other after intake piston 236a covers intake ports 244a and 244b and exhaust piston 236b covers exhaust ports 248a and 248b. The fuel may then be combusted with air in cylinder 230 when piston 236 is near top-dead-center compression stroke. The fuel and air ignite via compression ignition. In some examples, a universal Exhaust Gas Oxygen (UEGO) sensor 226 may be coupled to exhaust manifold 248 upstream of emissions device 271. In other examples, the UEGO sensor may be located downstream of one or more exhaust after treatment devices. Further, in some examples, the UEGO sensor may be replaced by a NOx sensor that has both NOx and oxygen sensing elements.

Engine 20 does not include glow plugs or spark plugs since it is a compression ignition engine and since it does not include a cylinder head. Further, engine 20 does not include poppet valves to regulate air and exhaust flow into and out of cylinder 230.

Exhaust system 231 carries exhaust away from engine 20 and processes exhaust gases. Exhaust valve 240 is shown positioned in exhaust passage 249 downstream of turbine 237a and upstream of emissions device 271. Alternatively, exhaust valve 240 may be positioned downstream of emissions device 271. Exhaust valve 240 may be opened and closed to control pressure in exhaust manifold 48. Closing exhaust valve 240 restricts flow through exhaust valve 240 and may increase pressure in exhaust manifold 248. Opening exhaust valve 240 may improve flow through exhaust valve 240 and reduce pressure in exhaust manifold 248.

Emissions device 271 may be an oxidation catalyst and it may be positioned upstream of SCR 272 and particulate filter 273, in one example. Temperature sensor 275 provides a temperature of SCR.

Controller 212 is shown in FIG. 2 as a conventional microcomputer including: microprocessor unit 202, input/output ports 204, read-only memory (e.g., non-transitory memory) 206, random access memory 208, keep alive memory 210, and a conventional data bus. Controller 212 is shown receiving various signals from sensors coupled to engine 20, in addition to those signals previously discussed, including: engine coolant temperature (ECT) from temperature sensor 212 coupled to cooling sleeve 214; a position sensor 234 coupled to an accelerator pedal 230 for sensing accelerator position adjusted by human foot 232; a measurement of engine manifold pressure (MAP) from pressure sensor 221 coupled to intake manifold 244; boost pressure from pressure sensor 222; exhaust gas oxygen concentration from oxygen sensor 226; an engine position sensor from a Hall effect sensor 218 sensing crankshaft 240b position; a measurement of air mass entering the engine from sensor 220 (e.g., a hot wire air flow meter); and a measurement of throttle position from sensor 258. Barometric pressure may also be sensed (sensor not shown) for processing by controller 212. In a preferred aspect of the present description, engine position sensor 218 produces a predetermined number of equally spaced pulses every revolution of the crankshaft from which engine speed (RPM) can be determined.

During operation, each cylinder within engine 20 typically undergoes a two stroke cycle: the cycle includes a first stroke where the intake piston 236a travels toward exhaust piston 236b and exhaust piston 236b travels toward intake piston 236a. In the second stroke, intake piston 236a travels away from exhaust piston 236b and exhaust piston 236b travels away from intake piston 236a. Intake piston 236a controls flow through intake ports 244a and 244b. Exhaust piston 236b controls flow through exhaust ports 248a and 248b. In this example, exhaust piston 236b leads intake piston 236a by reaching a top dead center position (e.g., a maximum distance exhaust piston 236b is from crankshaft 240b) a few crankshaft degrees (e.g., depending on configuration, the difference may range between 0 and 20 crankshaft degrees) before intake piston 236 a reaches its top dead center position (e.g., maximum distance intake piston 236a is from crankshaft 240a). Thus, exhaust piston motion is offset from intake piston motion by a few crankshaft degrees.

During the first stroke, generally, the intake piston 236a and exhaust piston 236b are moving toward each other to compress air that has entered cylinder 230. The stroke begins at bottom dead center (BDC) for intake piston 236a (intake piston 236a is closest distance to crankshaft 240a) and it ends at top dead center for intake piston 236a (intake piston 236a is at its farthest distance from crankshaft 240a). As previously mentioned, exhaust piston 236b leads intake piston 236a by a few degrees so that it is already traveling toward its TDC position when intake piston is at BDC. Further, exhaust piston 236b reaches its TDC position just before intake piston 236a reaches its TDC position. Exhaust piston 236b is located just after its TDC position when intake piston 36a reaches its TDC position. Cylinder volume is smallest when intake piston 236a and exhaust piston 236b are near their respective TDC positions. Air and fuel are compressed in cylinder 230 as intake piston 236a and exhaust piston 236b advance toward their respective TDC positions. Intake ports 244a and 244b are open and pressurized air flows into cylinder 230 when intake pistons 236a and exhaust piston 236b are near their respective BDC positions. Exhaust ports 248a and 248b are also open when intake piston 236a and exhaust piston 236b are near BDC. Supercharger compressor 262 and turbocharger compressor 235 provide pressurized air to intake manifold 244 which may flow into cylinder 230 when intake ports 244a and 244b are open. As intake piston 236a and exhaust piston 236b move toward their respective TDC positions, exhaust ports 248a and 248b close, then a few crankshaft degrees later intake ports 244a and 244b are closed to prevent additional air from entering cylinder 236. Fuel is injected to cylinder 230 after exhaust ports 244a and 244b close, then the fuel and air mixture is ignited when intake piston 236a and exhaust piston 236b are near their respective TDC locations. The fuel and air mixture is ignited by compression ignition and not via a spark plug or energy from a glow plug. Fuel may be injected to cylinder 230 via a plurality of injections including pilot injections, main injections, and post injections.

During the second stroke, generally, the intake piston 236a and exhaust piston 236b are moving apart from each other after combustion takes place in cylinder 230. The second stroke begins at TDC of intake piston 236a and it ends at BDC of intake piston 236a. Intake piston 236a and exhaust piston 236b approach their respective BDC positions near where volume of cylinder 230 is greatest. Gases expanding in cylinder 230 push intake piston 236a and exhaust piston 236b apart toward their respective BDC positions. Exhaust piston 236b passes exhaust ports 248a and 248b as it travels toward its BDC. Exhaust ports 248a and 248b are uncovered when top of exhaust piston 236d passes exhaust ports 248a and 248b while exhaust piston 236b is traveling toward crankshaft 240b. Exhaust gases exit cylinder 230 after exhaust piston 236b passes exhaust ports 248a and 248b while traveling toward bottom dead center. Intake pistons 236a and exhaust piston 236b travel further toward their respective bottom dead center positions, and after a predetermined actual total number of crankshaft degrees, intake piston 236a uncovers intake ports 244a and 244b. Intake ports 244a and 244b are uncovered when top of intake piston 236c passes intake ports 244a and 244b while intake piston 236a is traveling toward crankshaft 240a. Fresh air enters cylinder 230 via intake ports 244a and 244b when intake ports 244a and 244b are uncovered. Intake piston 236a and exhaust piston 236b continue to travel toward their respective BDC locations. After intake piston reaches BDC the cylinder cycle repeats.

Thus, the engine cycle is comprised of two strokes and the engine cycle is one engine revolution. Other engine cylinders operate in a similar way but these other cylinders may combust air and fuel out of phase with the cylinder shown. For example, top dead center compression stroke of one engine cylinder may be at zero crankshaft degrees while top dead center of another cylinder may be at one hundred and eighty crankshaft degrees.

The systems of FIGS. 1 and 2 provide for an engine system, comprising: a two stroke opposed piston diesel engine including at least one cylinder; an exhaust system coupled to the two stroke engine including an oxidation catalyst, a SCR, and a particulate filter; and a controller including executable instructions stored in non-transitory memory to increase exhaust flow to the SCR in response to ceasing to regenerate the particulate filter and SCR temperature being greater than a first threshold temperature. The engine system includes where the first threshold temperature is a temperature above which SCR efficiency is less than a threshold. The engine system further comprises additional instructions to increase exhaust flow to the SCR via increasing boost pressure in response to ceasing to regenerate the particulate filter. The engine system further comprises additional instructions to close a charge air cooler bypass valve and a supercharger bypass valve in response to ceasing to regenerate the particulate filter. The engine system further comprises additional instructions to close an EGR cooler bypass valve in response to ceasing to regenerate the particulate filter. The engine system further comprises additional instructions to reduce exhaust flow to the SCR in response to SCR temperature being less than the first threshold. The engine system further comprises additional instructions to reduce exhaust flow to the SCR in response to SCR temperature being less than a second threshold. The engine system further comprises injecting urea to the SCR in response to ceasing to regenerate the particulate filter and SCR temperature being less than the first threshold.

Referring now to FIGS. 3A and 3B, an example engine operating sequence according to the method of FIG. 4 is shown. The sequence may be provided via the systems of FIGS. 1 and 2 and their respective controllers may include the method of FIG. 4. Vertical lines represent times of interest (e.g., t1-t3) during the respective sequence plots. The sequences in the plots occur at the same time and the plots are aligned in time.

The first plot from the top of FIG. 3A represents a particulate filter (PF) regeneration request versus time. Trace 302 represents the particulate filter regeneration request state. The vertical axis represents particulate filter regeneration state and particulate filter regeneration is being requested when trace 302 is at a higher level near the vertical axis arrow. Particulate filter regeneration is not being requested when trace 302 is near the horizontal axis. The horizontal axis represents time and time increases from the left side to right side of the figure.

The second plot from the top of FIG. 3A represents variable geometry turbocharger (VGT) vane position versus time. Trace 304 represents vane position. The vertical axis represents vane position and vanes open in the direction of the vertical axis arrow. The horizontal axis represents time and time increases from the left side to right side of the figure.

The third plot from the top of FIG. 3A represents engine intake throttle position versus time. Trace 306 represents throttle position. The vertical axis represents throttle position and throttle opens in the direction of the vertical axis arrow. The horizontal axis represents time and time increases from the left side to right side of the figure.

The fourth plot from the top of FIG. 3A represents exhaust throttle position versus time. Trace 308 represents throttle position. The vertical axis represents exhaust throttle position and exhaust throttle opens in the direction of the vertical axis arrow. The horizontal axis represents time and time increases from the left side to right side of the figure.

The fifth plot from the top of FIG. 3A represents EGR cooler bypass valve state versus time. Trace 310 represents EGR cooler bypass valve state. The vertical axis represents EGR cooler bypass valve state and the EGR bypass valve is opened to bypass the EGR cooler when trace 310 is at a higher level near the vertical axis arrow. The EGR cooler bypass valve is closed so that the EGR cooler is not bypassed when trace 310 is at a lower level near the horizontal axis. The horizontal axis represents time and time increases from the left side to right side of the figure.

The sixth plot from the top of FIG. 3A represents charge air cooler (CAC) bypass valve state versus time. Trace 312 represents CAC bypass valve position. The vertical axis represents CAC bypass valve state and the CAC bypass valve is opened to bypass the CAC when trace 312 is at a higher level near the vertical axis arrow. The CAC bypass valve is closed so that the CAC is not bypassed when trace 312 is at a lower level near the horizontal axis. The horizontal axis represents time and time increases from the left side to right side of the figure.

The seventh plot from the top of FIG. 3A represents compressor bypass valve state versus time. Trace 314 represents compressor bypass valve position. The vertical axis represents compressor bypass valve state and the compressor bypass valve is opened to bypass the compressor when trace 314 is at a higher level near the vertical axis arrow. The compressor bypass valve is closed so that the compressor cooler is not bypassed when trace 314 is at a lower level near the horizontal axis. The horizontal axis represents time and time increases from the left side to right side of the figure.

The first plot from the top of FIG. 3B represents urea injection amount versus time. Trace 318 represents urea injection amount. The vertical axis represents urea injection amount and urea injection amount increases in the direction of the vertical axis arrow. The horizontal axis represents time and time increases from the left side to right side of the figure.

The second plot from the top of FIG. 3B represents SCR temperature versus time. Trace 320 represents SCR temperature. The vertical axis represents SCR temperature and SCR temperature increases in the direction of the vertical axis arrow. The horizontal axis represents time and time increases from the left side to right side of the figure. Horizontal line 350 is a first threshold value above which SCR efficiency is less than a threshold (e.g., 30%). Horizontal lines 352 and 354 are upper and lower bounds of a desired SCR temperature range where SCR efficiency may be greater than a threshold (e.g., 90%).

The third plot from the top of FIG. 3B represents engine boost pressure (e.g., pressure in boost chamber 46 or boost chamber 246) versus time. Trace 322 represents boost pressure. The vertical axis represents boost pressure and boost pressure increases in the direction of the vertical axis arrow. The horizontal axis represents time and time increases from the left side to right side of the figure.

The fourth plot from the top of FIG. 3B represents low pressure EGR flow versus time. Trace 324 represents low pressure EGR flow. The vertical axis represents low pressure EGR flow and low pressure EGR flow increases in the direction of the vertical axis arrow. The horizontal axis represents time and time increases from the left side to right side of the figure.

The fifth plot from the top of FIG. 3B represents supercharger compressor drive ratio versus time. Trace 326 represents supercharger compressor drive ratio. The vertical axis represents supercharger compressor drive ratio and supercharger compressor drive ratio increases in the direction of the vertical axis arrow. The horizontal axis represents time and time increases from the left side to right side of the figure.

The sixth plot from the top of FIG. 3B represents high pressure EGR flow versus time. Trace 328 represents high pressure EGR flow. The vertical axis represents high pressure EGR flow and high pressure EGR flow increases in the direction of the vertical axis arrow. The horizontal axis represents time and time increases from the left side to right side of the figure. Although not shown, driver demand torque is substantially constant (e.g., changing by less than ±5% of the desired value) and engine speed is substantially constant throughout the sequence of FIGS. 3A and 3B.

At time t0, the engine is operating and combusting air and fuel (not shown). The particulate filter is being regenerated as indicated by the PF state trace being at a higher level. The VGT vanes are partially closed and the intake throttle is at a middle position. The exhaust throttle is partially open and the EGR cooler bypass valve is fully open to bypass the EGR cooler. The CAC valve is fully open and the compressor bypass valve is partially open. The EGR valve is partially open and urea is not being injected. The SCR temperature is above threshold 350 so its efficiency is low. Boost pressure is at an upper middle level. Low pressure EGR flow is at a middle level and high pressure EGR flow is at a higher middle level. The supercharger compressor drive ratio is a lower drive ratio.

At the time t1, the particulate filter regeneration completes as is indicated by the particulate filter regeneration request transitioning from a higher level to a lower level. The VGT vanes are fully closed and the intake throttle is fully opened in response to the particulate filter regeneration completing. The exhaust throttle is also fully opened and the EGR cooler bypass valve is closed in response to the particulate filter regeneration completing. The CAC valve is also fully closed and the compressor bypass valve is fully closed in response to the particulate filter regeneration completing. The EGR valve is opened responsive to engine speed and driver demand torque to control engine NOx output while SCR conversion efficiency is low. Urea is not injected while SCR temperature is high so that urea may be conserved until SCR efficiency may be higher. SCR temperature remains above threshold 350. Boost pressure is increased in response to ceasing particulate filter regeneration. The low pressure EGR flow is increased and the high pressure EGR flow is decreased. Further, the supercharger compressor drive ratio is increased.

By increasing boost pressure and closing the CAC, exhaust flow to the SCR may be increased. Further, closing the CAC may help to reduce exhaust gas temperature so that cooler exhaust gases may flow to the SCR, thereby cooling the SCR. Closing the compressor bypass increases compressor efficiency to increase exhaust flow and closing the EGR cooler bypass cools EGR, thereby cooling engine exhaust gases that are directed to the SCR. Opening the engine throttle and/or the exhaust throttle may increase engine air flow so that the SCR may be cooled faster. Increasing the supercharger compressor drive ratio increases air flow through the engine. Increasing low pressure EGR also increases flow through the engine, which may be particularly useful at engine idle speed since engine boost may be limited by low engine speed. The high pressure EGR amount is decreased so that EGR flow is not excessive.

Between time t1 and time 2, the SCR temperature decreases and exhaust continues to flow to the SCR at a higher flow rate than if boost pressure and exhaust flow were adjusted responsive solely to driver demand torque and engine speed. Particulate filter regeneration is not requested and VGT vanes are fully closed. The intake and exhaust throttles are fully open and the EGR cooler bypass valve is fully closed. The CAC bypass valve is fully closed and the compressor bypass valve is fully closed. Urea is not being injected and the boost pressure increases and then levels off at a higher level. The low pressure EGR flow increases and then levels off. The high pressure EGR is decreased and then it levels off to a constant value. The supercharger compressor drive ratio remains elevated.

At time t2, SCR temperature is less than threshold 350 so that boost pressure is lowered to reduce exhaust flow and increase engine efficiency. Urea injection also begins in response to SCR temperature being less than threshold 350. A small amount of urea is injected to promote SCR efficiency. The VGT vane position is opened to reduce boost pressure and the engine intake and exhaust throttles remain fully open. The EGR cooler bypass valve remains closed and the CAC cooler bypass valve is also fully closed. The compressor bypass valve remains closed and the SCR temperature continues to decrease after time t2 and SCR efficiency continues to increase (not shown). The supercharger compressor drive ratio remains constant and the low and high pressure EGR flows remain at their previous values.

At time t3, SCR temperature is reduced to less than threshold 352. The NOx conversion efficiency of the SCR is increased (not shown) when the SCR temperature falls to a temperature below threshold 352. The boost pressure is decreased further to a level that corresponds to the present engine speed and driver demand torque. The amount of urea injected also increases to further increase SCR efficiency. Particulate filter regeneration is not requested and VGT vanes are opened to decrease boost pressure in response to the SCR temperature. The exhaust and intake throttles are partially closed and the EGR cooler bypass valve is opened in response to SCR temperature being less than threshold 350. The CAC and compressor bypass valves are also closed in response to SCR temperature being less than threshold 350. The EGR valve position remains steady. The supercharger compressor drive ratio is reduced and the high pressure EGR flow is increased. The low pressure EGR flow is decreased.

In this way, SCR efficiency may be increased after particulate filter regeneration to reduce engine emissions. The exhaust flow to the SCR may be increased and exhaust gas temperature may be decreased to decrease SCR temperature. Further, when SCR temperature is reduced to less than a first threshold temperature, the rate of SCR cooling may be reduced so that engine efficiency may be increased even while SCR cooling continues.

Referring now to FIG. 4, a method for operating an engine is shown. In particular, a flowchart of a method for operating an internal combustion engine is shown. The method of FIG. 4 may be stored as executable instructions in non-transitory memory in systems such as shown in FIGS. 1 and 2. The method of FIG. 4 may be incorporated into and may cooperate with the systems of FIGS. 1 and 2. Further, at least portions of the method of FIG. 4 may be incorporated as executable instructions stored in non-transitory memory while other portions of the method may be performed via a controller transforming operating states of devices and actuators in the physical world. The controller may employ engine actuators of the engine system to adjust engine operation, according to the methods described below.

At 402, method 400 determines engine operating conditions. Engine operating conditions may include but are not limited to engine temperature, accelerator pedal position, particulate filter soot loading, ambient temperature, ambient pressure, driver demand torque, and engine speed. Engine operating conditions may be determined via engine sensors and the engine controller. Method 400 proceeds to 404.

At 404, method 400 determines if diesel particulate filter (DPF) regeneration is desired. In one example, method 400 determines if diesel particulate filter regeneration is desired responsive to a pressure drop across the particulate filter. In other examples, method 400 may judge that particulate filter regeneration is desired after a vehicle has been driven farther than a threshold distance. If method 400 judges that diesel particulate filter regeneration is desired, the answer is yes and method 400 proceeds to 406. Otherwise, the answer is no and method 400 proceeds to 424.

At 406, method 400 increases boost pressure (e.g., pressure in an engine air intake) as compared to boost pressure for the same engine speed and driver demand torque when the diesel particulate filter is not being regenerated. Further, the engine intake throttle is partially closed to increase exhaust gas temperature. Method 400 proceeds to 408.

At 408, method 400 begins post injecting fuel to engine cylinders. Post injected fuel is injected after main fuel injections and at least a portion of the port injected fuel is expelled from engine cylinders to oxidize in an oxidation catalyst where it may raise exhaust gas temperature, thereby facilitating particulate filter regeneration. Method 400 proceeds to 410 after beginning to post inject fuel.

At 410, method 400 judges if diesel particulate filter regeneration is complete. In one example, method 400 judges that particulate filter regeneration is complete if a pressure drop across the diesel particulate filter is less than a threshold. If method 400 judges that particulate filter regeneration is complete, the answer is yes and method 400 proceeds to 412. Otherwise, method 400 returns to 408.

At 412, method 400 ceases post injected fuel and ceases particulate filter regeneration. Further, method 400 increases boost pressure, or alternatively, maintains boost pressure after particulate filter regeneration ceases. The boost pressure may be increased while driver demand torque is maintained substantially constant (e.g., changing by less than ±5% of the desired value). Further, the boost pressure may be increased even though driver demand is decreasing or increasing. The boost pressure may be increased via a turbocharger compressor or a supercharger compressor. Method 400 also opens engine intake and/or exhaust throttles. By increasing boost and opening intake and/or exhaust throttles, exhaust flow to the SCR may be increased to cool the SCR. Method 400 proceeds to 414.

At 414, method 400 closes the CAC bypass valve, closes the EGR cooler bypass valve, and closes the supercharger bypass valve. The CAC bypass, EGR bypass, and supercharger bypass are closed to cool exhaust gases. Further, method 400 may increase the supercharger compressor drive ratio to increase flow through the engine and SCR. Increasing the supercharger drive ratio increase compressor speed relative to crankshaft speed. Variable geometry turbocharger (VGT) vanes and a supercharger (SC) bypass valve may also be closed to increase engine air flow. In some instances the VGT vanes may be partially closed to a position that provides an upper threshold boost pressure (e.g., a maximum boost pressure) responsive to ceasing particulate filter regeneration and other engine operating conditions. Method 400 proceeds to 416.

At 416, method 400 adjusts the EGR valve in response to engine speed and driver demand torque. Thus, if engine speed and load are constant, the EGR valve position is held constant. However, if the engine includes high and low pressure EGR passages, the low pressure EGR flow may also be increased and the high pressure EGR flow may also be decreased to further increase engine air flow while reducing engine NOx. The low and high pressure EGR valve positions may be adjusted responsive to engine speed and load after increasing the ratio of low pressure EGR to high pressure EGR (e.g., low pressure EGR amount or flow/high pressure EGR amount or flow). Increasing the flow of low pressure EGR flow and decreasing the high pressure EGR flow may increase engine efficiency while maintaining engine NOx emissions.

At 418, method 400 judges if SCR temperature is less than a first threshold temperature. The first threshold temperature may be a temperature (e.g., 380° C.) above which, SCR NOx conversion efficiency is less than a threshold (e.g., less than 30%). If method 400 judges that SCR temperature is less than the first threshold temperature, the answer is yes and method 400 proceeds to 420. Otherwise, method 400 returns to 418 so that SCR cooling continues.

At 420, method 400 decreases boost pressure. Boost pressure may be decreased as a function of driver demand torque and SCR temperature. In one example, desired boost pressure is empirically determined and stored in a table or function that is referenced or indexed via SCR temperature and driver demand torque. In one example, the boost pressure is reduced to provide a desired level of engine efficiency improvement for a desired reduction in SCR cooling. Method 400 decreases boost pressure via opening a waste gate or opening variable position turbocharger vanes and proceeds to 422.

At 422, method 400 judges if SCR temperature is less than a second threshold temperature. In one example, the second threshold temperature is a temperature above which SCR NOx conversion efficiency is less than a threshold efficiency (e.g., 90%). If method 400 judges that SCR temperature is less than the second threshold temperature, the answer is yes and method 400 proceeds to 424. Otherwise, the answer is no and method 400 returns to 422.

At 424, method 400 adjusts the CAC bypass valve, EGR valve, EGR cooler bypass valve, boost, low pressure EGR, high pressure EGR, and supercharger drive ratio, and supercharger bypass valve in response to driver demand torque and engine speed. In other words, the SCR is operating in a desired temperature range and therefore, the aforementioned actuators are not adjusted to cool the SCR, but rather to provide a desired demand torque while operating the engine efficiently. Method 400 proceeds to exit.

Thus, method 400 provides for an engine operating method, comprising: increasing boost pressure in an engine air intake via a controller while driver demand torque is substantially constant in response to ceasing regeneration of a particulate filter. The engine method includes where boost pressure is increased via at least partially closing vanes of a turbocharger, and further comprising increasing low pressure exhaust gas recirculation flow and decreasing high pressure exhaust gas recirculation flow in response to ceasing regeneration of the particulate filter. The engine method further comprises opening an intake throttle in response to ceasing regeneration of the particulate filter and increasing a drive ratio of a supercharger compressor to increase the boost pressure. The engine method further comprises closing an EGR cooler bypass valve in response to ceasing regeneration of the particulate filter. The engine method further comprises closing a charge air cooler bypass valve in response to ceasing regeneration of the particulate filter. The engine method further comprises closing a compressor bypass valve in response to ceasing regeneration of the particulate filter. The engine method further comprises opening an exhaust throttle in response to ceasing regeneration of the particulate filter.

The method of FIG. 4 also provides for an engine operating method, comprising: increasing boost pressure in an engine air intake via a controller while driver demand torque is substantially constant in response to ceasing regeneration of a particulate filter; and adjusting an EGR valve position based on driver demand torque and engine speed in response to ceasing the regeneration of the particulate filter and before SCR temperature is less than a first threshold temperature. The engine method includes where the EGR valve is a low pressure EGR valve, and further comprises further adjusting the low pressure EGR valve to increase low pressure EGR flow and increase exhaust flow to a SCR in response to ceasing regeneration of the particulate filter and before SCR temperature is less than the first threshold temperature. The engine method further comprises decreasing exhaust flow to the SCR in response to SCR temperature being less than the first threshold temperature. The engine method further comprises injecting urea to the SCR in response to SCR temperature being less than the first threshold temperature. The engine method further comprises decreasing exhaust flow to the SCR in response to the SCR temperature being less than a second threshold temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
    determining ceasing regeneration of a particulate filter; and
    increasing boost pressure in an engine air intake via a controller while driver demand torque is substantially constant in response to ceasing regeneration of the particulate filter to increase a selective catalytic reduction catalyst (SCR) efficiency via cooling a temperature of the SCR below a first threshold temperature.

2. The engine method of claim 1, where boost pressure is increased via at least partially closing vanes of a turbocharger, and further comprising:
    increasing low pressure exhaust gas recirculation flow and decreasing high pressure exhaust gas recirculation flow in response to ceasing regeneration of the particulate filter.

3. The engine method of claim 1, further comprising opening an intake throttle in response to ceasing regeneration of the particulate filter and increasing a drive ratio of a supercharger compressor to increase the boost pressure.

4. The engine method of claim 3, further comprising closing an EGR cooler bypass valve in response to ceasing regeneration of the particulate filter.

5. The engine method of claim 4, further comprising closing a charge air cooler bypass valve in response to ceasing regeneration of the particulate filter.

6. The engine method of claim 5, further comprising closing a compressor bypass valve in response to ceasing regeneration of the particulate filter.

7. The engine method of claim 1, further comprising opening an exhaust throttle in response to ceasing regeneration of the particulate filter.

8. An engine operating method, comprising:
    determining ceasing regeneration of a particulate filter;
    increasing boost pressure in an engine air intake via a controller while driver demand torque is substantially constant in response to ceasing regeneration of the particulate filter to increase a selective catalytic reduction catalyst (SCR) efficiency via cooling a temperature of the SCR below a first threshold temperature; and
    adjusting an EGR valve position based on the driver demand torque and engine speed in response to ceasing the regeneration of the particulate filter and before SCR temperature is less than the first threshold temperature.

9. The engine method of claim 8, where the EGR valve is a low pressure EGR valve, and further comprising:
    further adjusting the low pressure EGR valve to increase low pressure EGR flow; and
    increasing exhaust flow to a SCR in response to ceasing regeneration of the particulate filter, the exhaust flow increased before the SCR temperature is less than the first threshold temperature.

10. The engine method of claim 9, further comprising decreasing the exhaust flow to the SCR in response to the SCR temperature being less than the first threshold temperature.

11. The engine method of claim 10, further comprising injecting urea to the SCR in response to the SCR temperature being less than the first threshold temperature.

12. The engine method of claim 11, further comprising decreasing exhaust flow to the SCR in response to the SCR temperature being less than a second threshold temperature.

13. An engine system, comprising:
    a two stroke opposed piston diesel engine including at least one cylinder;
    an exhaust system coupled to the two stroke engine including an oxidation catalyst, a selective catalytic reduction catalyst (SCR), and a particulate filter; and
    a controller including executable instructions stored in non-transitory memory to increase exhaust flow to the SCR via increasing boost pressure while driver demand torque is substantially constant in response to ceasing to regenerate the particulate filter and a SCR temperature being greater than a first threshold temperature,
    where the first threshold temperature is a temperature above which SCR efficiency is less than a threshold.

14. The engine system of claim 13, further comprising additional instructions to close a charge air cooler bypass valve and a supercharger bypass valve in response to ceasing to regenerate the particulate filter.

15. The engine system of claim 14, further comprising additional instructions to close an EGR cooler bypass valve in response to ceasing to regenerate the particulate filter.

16. The engine system of claim 13, further comprising additional instructions to reduce exhaust flow to the SCR in response to the SCR temperature being less than the first threshold temperature.

17. The engine system of claim 16, further comprising additional instructions to reduce exhaust flow to the SCR in response to the SCR temperature being less than a second threshold temperature.

18. The engine system of claim 17, further comprising injecting urea to the SCR in response to ceasing to regenerate the particulate filter and the SCR temperature being less than the first threshold temperature.

* * * * *